United States Patent

[11] 3,634,862

| [72] | Inventors | Harold C. Hiscox<br>Pasadena;<br>Larry R. Arnold, Glen Burnie, both of Md. |
|---|---|---|
| [21] | Appl. No. | 825,840 |
| [22] | Filed | May 19, 1969 |
| [45] | Patented | Jan. 11, 1972 |
| [73] | Assignee | Westinghouse Electric Corporation<br>Pittsburgh, Pa. |

[54] PRECISION APPROACH AND LANDING SYSTEM
12 Claims, 4 Drawing Figs.

[52] U.S. Cl. .................................................. 343/108, 343/102
[51] Int. Cl. .................................................. G01s 1/16, G01s 1/18
[50] Field of Search .......................................... 343/108; 343/102

[56] References Cited
UNITED STATES PATENTS

| 3,115,634 | 12/1963 | Karpeles .................. | 343/108 |
| 3,351,941 | 11/1967 | Page ...................... | 343/108 X |

*Primary Examiner*—Rodney D. Bennett, Jr.
*Assistant Examiner*—R. Kinberg
*Attorneys*—F. H. Henson and E. P. Klipfel ABSTRACT: A precision approach and landing system (PAALS) utilizing phase interferometers disposed perpendicular to each other and each including two antenna elements separated by a predetermined distance. Carrier signals are radiated from the antennas in timed sequence to allow separation of the signals emitted from the various ground antenna elements. The use of timed signals allows simpler hardware and more accurate implementation than heretofore available.

PRECISION APPROACH AND LANDING SYSTEM

The invention herein described was made in the course of a contract with the Aeronautical Systems Division of The Air Force Systems Command.

BACKGROUND OF THE INVENTION

1. Field of the Invention

The present invention relates generally to precision approach and landing systems and more particularly relates to a system which utilizes microwave interferometers radiating timed carrier pulses and receiver means for detecting the radiated carrier phase to supply angular guidance.

2. Description of the Prior Art

Present instrument landing systems have major defects when considered for tactical landing use. Previous attempts to implement and improve landing systems have not achieved acceptance because they require extensive aircraft modification and large complex ground installations.

The present VHF-UHF instrument landing systems have four basic defects when considered for tactical landing use. First, the units are heavy and bulky. Second, they take up to a month to achieve satisfactory accuracy in the landing guidance data. Third, the ground reflections can cause serious beam bending with nonideal terrain situations. Finally, the glide slope angle should be cockpit selectable which is not possible with the present equipment.

There have been many attempts to implement an instrument landing system which can overcome the major defects of the present equipment. So far, none of the proposed equipment concepts have achieved wide acceptance for a number of reasons. In general, the new systems require extensive aircraft modification as well as a large maintenance program due to their complexity. The system concept of the present invention overcomes limitations of existing equipments without introducing the objections associated with other improvement concepts. The proposed system utilizes, and is fully compatible with, the present TACAN equipment. TACAN is a basic en route and terminal navigation system and almost all aircraft contain this type equipment. Thus, the present invention can be introduced into the field in an orderly and economical fashion.

SUMMARY OF THE INVENTION

Accordingly an object of the present invention is to provide a precision approach and landing system which can be introduced into the field in an orderly and economical fashion.

Another object of the present invention is to provide a precision approach and landing system which is compatible with TACAN equipment currently on many aircraft.

Another object of the present invention is to provide an instrument landing system of simpler hardware but capable of more accurate implementation than prior art systems.

Briefly, the present invention accomplishes the above-cited objects and other advantages and objects by utilizing phase interferometer techniques to obtain basic angle deviations. Vertically and horizontally disposed interferometers, each including two antennas separated by a distance, radiate carrier signals which are separated in point of time. The radiated carrier signals appear at a receiver as a pair of pulse pairs which may be preceded, if desired, by a reference pulse. The first pulse pair contains glide slope (elevation) guidance while the second pair contains localizer (azimuth) guidance.

BRIEF DESCRIPTION OF THE DRAWING

Further objects and advantages of the present invention will be more readily apparent from the following detailed description taken in conjunction with the drawing in which.

DESCRIPTION OF THE PREFERRED EMBODIMENT

SYSTEM DESCRIPTION

Figure 1:
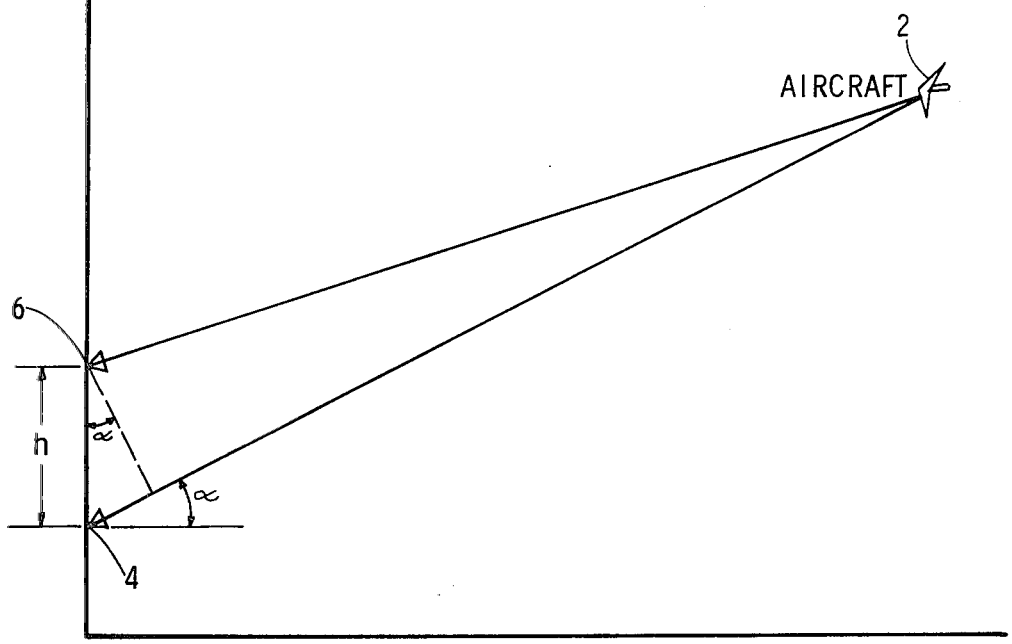
FIG. 1 is a geometric illustration of a basic principle of the present invention.

The basic angle measurement technique utilized in the proposed landing system of the present invention is that of a phase interferometer. In order to understand the technique, consider two point antennas separated by a distance $h$. The aircraft being guided is relatively far from the two point antennas. FIG. 1 depicts this geometry. A vertical interferometer glide slope is shown, the extension to the localizer interferometer readily follows.

If a signal is radiated from the upper antenna and another, recognizable, signal is radiated from the lower antenna, the elevation angle $\alpha$ is related to the difference in phase of the received signals. This relationship can be expressed as $\alpha = \sin^{-1}(\lambda \phi / 2\pi h)$ where $\phi$ is the received carrier phase difference between the two signals as measured aboard an aircraft 2, $h$ is the separation of the two point antennas 4 and 6; and $\lambda$ is in carrier wavelength.

The present invention utilizes a vertical interferometer to provide guidance similar to current ILS glide slopes and a horizontal interferometer, perpendicular to the runway centerline, to provide guidance similar to the current ILS localizer. When desired, distance measuring equipment can be provided as an add-on module to the interferometer glide slope to provide distance to touch-down inputs to airborne flair computers.

In order to provide accurate guidance information, the airborne receiver must be able to unambiguously associate the signals with the appropriate antennas. The present invention radiates a carrier pulse from the antenna 6, or upper antenna, and a carrier pulse from the antenna 4, or lower antenna. In such a manner the glide slope information is provided by a vertically disposed interferometer which generates a first pair of pulses spaced from each other in point of time. Likewise, a second pair of pulses is generated from a horizontally disposed interferometer to provide localizer information when desired. The timing of the radiated signals is illustrated in the timing diagram of FIG. 2. The pair of radiated pulse pairs may be preceded and/or followed by a reference pulse 8. The first pair 10 of pulses contains the glide slope guidance, while the second pair 12 contains the localizer guidance.

GROUND EQUIPMENT

Figure 3:
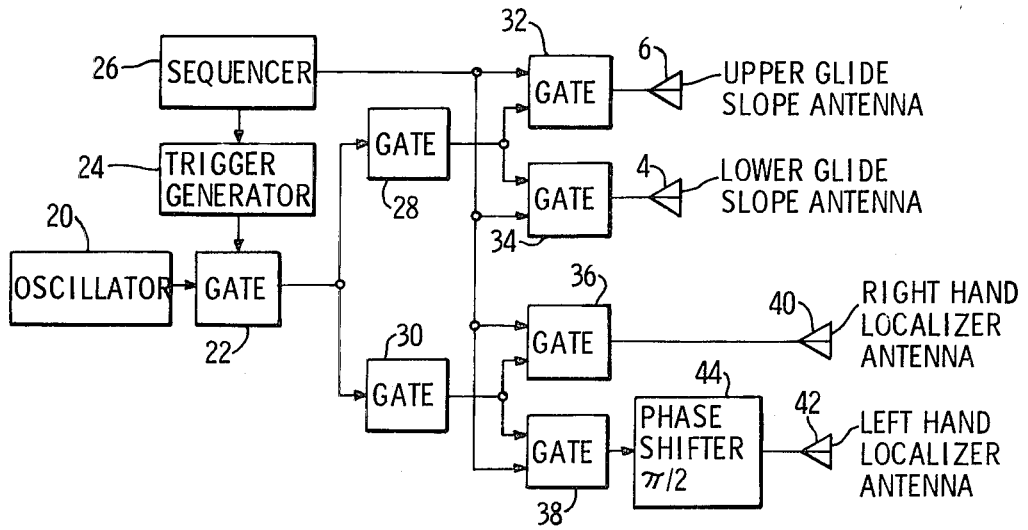
FIG. 3 is an illustrative embodiment of ground equipment of the present invention.

FIG. 3 is a functional block diagram of the ground based portion of the present invention. An oscillator 20 provides a carrier signal which is gated at 22 in response to a trigger generator 24 actuated by a sequencer 26. Gates 28 and 30 determine whether the glide slop interferometer or the localizer interferometer is energized.

Figure 2:
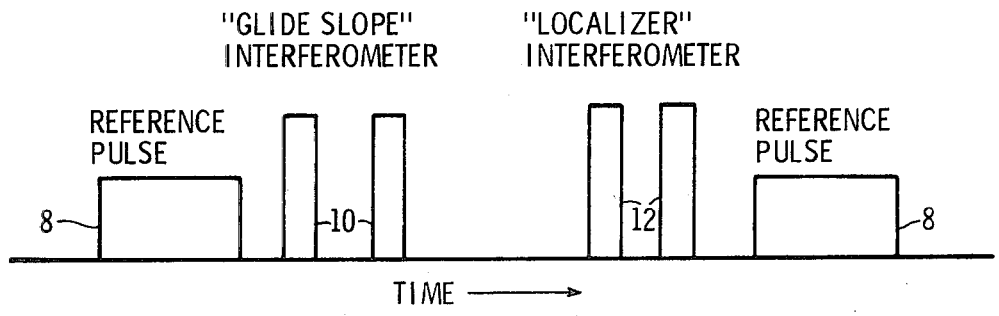
FIG. 2 is a signal timing diagram useful in understanding the operation of the present invention.

The sequencer 26 enable gates 32 and 34 is a sequence as illustrated by the signal timing diagram of FIG. 2. Antennas 6 and 4 are energized in timed sequence to provide a first pair of pulses from the interferometer providing glide slope information. Subsequently, sequencer 26 enables gates 36 and 38 to energize the right localizer antenna 40 and the left-hand localizer antenna 42 in timed sequence to radiate the second pair 12 of pulses containing azimuth information.

It is to be noted that at the left-hand localizer antenna 42 a phase shifter 44 has been included. It can be readily demonstrated that a $(\pi/2)$ phase shift in the signal from the antenna 42 will remove the guidance degradation which is caused by reflections from a runway.

It is to be appreciated that the performance of the present system can be effected by several factors. Prominent among these factors are (a) system accuracy, (b) beam shaping, and (c) equipment mobility.

With regard to system accuracy, certain ambiguity separation trade-offs can be made. Phase interferometers can be made extremely precise by extending the base line; that is, the phase center separation of the antenna. However, as the base line is extended ambiguous solutions enter and means for resolving the ambiguity must be provided. In order to meet guidance accuracy requirements while maintaining a reasonable false course separation, the following representative phase center separation requirements may be advantageously utilized. The glide slope antennas 6 and 4, for example, can be separated by approximately 5.8 λ or 6 feet while the localizer antennas 40 and 42, for example, may be separated by 3.0 λ or 3 feet.

The ambiguous course separations of 10° and 20° respectively are sufficient since ambiguities of this order can be resolved. The aircraft will be in the area of unambiguous signal prior to changing to the PAALS guidance.

These phase center separations require the received phase difference to be measured to an accuracy of 3.6° to achieve acceptable accuracy for category III landings. These accuracies and phase center separations result in localizer course accuracy of 0.2° and glide slope accuracy of 0.1°. To obtain the 3.6° phase measuring accuracy, the signal to noise ratio at the input to the receiving phase detector must be at least 24 db. However, the phase measuring error is not the only system error source. Since other system error sources can contribute errors at the same magnitude, the signal to noise ratio at the input to the phase detector should be increased to 25 db. This signal to noise ratio provides for phase measuring accuracy on the order of 2°.

It is desireable to minimize ground reflection effects which can be accomplished, for example, by beam shaping. Ground reflections have been a major deficiency of previous existing and proposed landing systems. An analysis indicates that the ratio of the direct path to reflected path signal strengths should be about 30 db. In the case of the localizer antennas 40 and 42 possible reflections which need to be suppressed are at least 5° from the desired course. However, for the glide sloping antennas 6 and 4 the requirement is much more stringent in that the desired courses and possible reflections are separated by as little as 1° to 2°. In addition to the sharp edge, the glide slope pattern must be relatively broad to provide guidance to elevation angles above 10°. To meet the beam shaping requirements while maintaining the phase center separation, array antennas should be employed.

AIRBORNE EQUIPMENT

Figure 4:
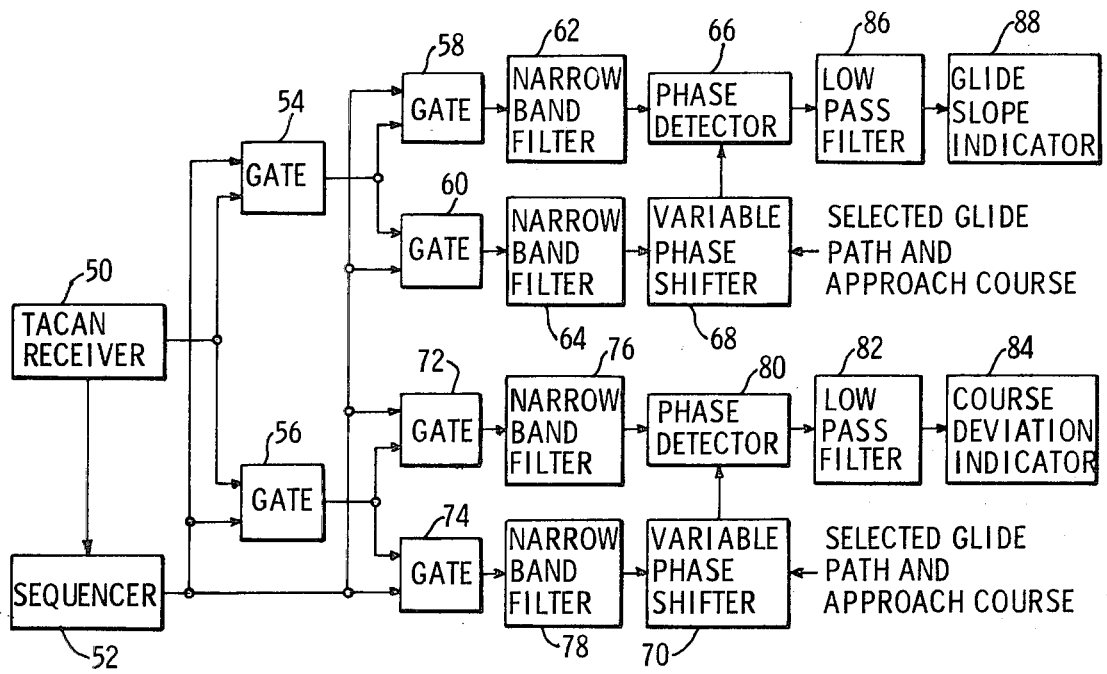
FIG. 4 is a schematic block diagram of an illustrative embodiment of airborne equipment of the present invention.

FIG. 4 provides a block diagram of the airborne portion of the present invention. The illustrative embodiment is shown in the standard ILF mode rather than for input to a flight director or flare computer to present a self-contained example of the implementation.

A conventional TACAN receiver 50 actuates a sequencer 52 which in turn enables gates 54 and 56 to receive the first pair of pulses 10 or second pair of pulses 12, respectively. The sequencer 52 may be actuated, for example by receipt of a reference pulse 8. The sequencer 52 and the gate structure of FIG. 4 is similar to that utilized in the ground equipment of FIG. 3. The signal timing diagram of FIG. 2 is used to identify the origin of the received signals.

The carrier signal from the upper antenna 6 of the glide slope interferometer arrives at the aircraft sometime before the carrier signal from the lower antenna 4. The same can be stated relative to the localizer signals received from antennas 40 and 42, respectively. The first pair of pulses in the glide slope channel are to be phase detected to determine the elevation angle, but they do not occur at the same instant. Thus, some form of delay must be introduced to achieve time coincidence between the first pair of signals.

The delay choice is a narrow band filter because it is simpler to implement and is lighter than the usual delay lines.

More particularly, in the glide slope channel, gates 58 and 60 pass the received carrier pulses when enabled by the sequencer 52. A narrow band filter 62 delays the first of the pair of pulses so that it will be in timed coincidence with the other pulse of the pair which is subsequently passed through the gate 60. A second narrow band filter 64 is connected to the gate 60 to reduce the bandwidth requirements on a following phase detector 66 to increase the accuracy of the system. Both filters are selected to be of narrow bandwidth relative to the bandwidth of the carrier signal. When the filter bandwidth is 1/20th or less than the signal bandwidth, the signal will act as if it were an impulse and the filter will ring in phase with the input signal. Hence, the exact carrier frequency of the input signal will have little effect on the amplitude of filter output. The phase difference between the two received carrier signals is then compared in a phase detector 66. Thus, local oscillator drift and doppler will not affect the system accuracy.

A variable phase shifter 68 is inserted in both the glide slope and localizer channels. In such a manner a selected glide path and approach course can be inserted into each channel to produce a bias indicating the desired course. The pilot dials his selected glide path and approach course within the cockpit by setting the glide slope phase shifter 68 and localizer phase shifter 70.

Similarly, in the localizer channel gates 72 and 74 pass the second pair of signals through narrow band filters 76 and 78 to be phase detected by the detector 80.

The output of the phase detector 80 is passed through a low pass filter 82 and provides a narrow signal proportional to the deviation from the desired localizer path. The error signal is fed from the low pass filter 82 to the localizer needle for cockpit presentation in the course deviation indicator 84. Likewise, the error signal proportional to the deviation from the desired glide slope is also fed to a glide slope needle in the glide slope indicator 88 for cockpit presentation. This display will also act to smooth short term transients and random errors from the guidance information.

While the present invention has been described with a degree of particularity for the purposes of illustration, it is to be understood that all modifications, alterations and substitutions within the spirit and scope of the present invention and herein meant to be included.

We claim as our invention:

1. A precision approach and landing system comprising, in combination:
   phase interferometer means including spaced apart antennas;
   means for radiating a first carrier signal from one of said antennas and a second carrier signal from the other of said antennas;
   means for delaying said second carrier from said first carrier signal;
   receiver means responsive to the difference in phase of the received carrier signals for locating a position disposed from said interferometer means.

2. The combination of claim 1 including means for providing a second reference signal following said carrier signals, said second reference signal together with said preceding reference signal bracketing said carrier signals.

3. A precision approach and landing system comprising, in combination:
   phase interferometer means including a glide slope interferometer and a localizer interferometer each including at least two point antennas;
   means for radiating a pair of carrier signals from said glide slope interferometer which are displaced in time; and
   means for radiating a pair of carrier signals from said localizer interferometer which are displaced in time from each other and said other pair of carrier signals.

4. The combination of claim 3 including means for preceding said respective pairs of carrier signals by a reference pulse.

5. The combination of claim 4 including means for following said respective pairs of carrier signals by a reference pulse.

6. The combination of claim 4 including receiver means for detecting the phase difference between said first pair of carrier signals to determine the angle of elevation of said receiver means from the location of said glide slope interferometer.

7. The combination of claim 3 including receiver means for detecting the phase difference between each pair of said carrier signals.

8. The combination of claim 7 wherein said receiver means includes delay means for coinciding in point of time each of said signals comprising said first pair and coinciding in point of time each of the signals of said second pair of carrier signals.

9. The combination of claim 8 wherein said delay means is a narrow band filter.

10. The combination of claim 9 wherein said narrow band filter has a bandwidth of 1/20th or less than the carrier bandwidth.

11. The combination of claim 10 wherein said narrow band filter provides an impulse signal which rings in phase with the carrier signal.

12. The combination of claim 7 wherein said receiver means includes variable phase shifter means for each pair of carrier signals to bias for a desired course and phase detector means for comparing said phase difference with the bias phase to obtain an error signal proportional to the deviation from the desired course.

* * * * *